(12) United States Patent
Nakhla et al.

(10) Patent No.: US 12,508,964 B2
(45) Date of Patent: Dec. 30, 2025

(54) JUVENILE RESTRAINT

(71) Applicant: Dorel Juvenile Group, Inc., Foxboro, MA (US)

(72) Inventors: Said S. Nakhla, Daphne, AL (US); Jonathan M. Holtman, Brownsburg, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 202 days.

(21) Appl. No.: 18/411,346

(22) Filed: Jan. 12, 2024

(65) Prior Publication Data

US 2024/0239252 A1 Jul. 18, 2024

Related U.S. Application Data

(60) Provisional application No. 63/438,894, filed on Jan. 13, 2023.

(51) Int. Cl.
*B60N 2/56* (2006.01)
*B60N 2/28* (2006.01)

(52) U.S. Cl.
CPC ......... *B60N 2/5621* (2013.01); *B60N 2/2803* (2013.01); *B60N 2/2821* (2013.01); *B60N 2/2851* (2013.01)

(58) Field of Classification Search
CPC .. B60N 2/2803; B60N 2/2821; B60N 2/2851; B60N 2/5621
See application file for complete search history.

(56) References Cited

U.S. PATENT DOCUMENTS

| | | | | |
|---|---|---|---|---|
| 6,079,781 A | * | 6/2000 | Tilley | B60N 2/5657 297/487 |
| 6,106,057 A | * | 8/2000 | Lee | B60N 2/5635 297/250.1 |
| 10,252,645 B1 | * | 4/2019 | Peterson | B60N 2/28 |
| 11,173,817 B2 | * | 11/2021 | Ferrell | B60N 2/2845 |
| 2009/0277190 A1 | * | 11/2009 | Piette | B60N 2/28 62/3.2 |
| 2010/0133883 A1 | * | 6/2010 | Walker | B60N 2/5692 62/259.3 |
| 2010/0295339 A1 | * | 11/2010 | Siu | B60N 2/5635 297/180.14 |
| 2015/0061331 A1 | * | 3/2015 | Yang | B60N 2/2866 297/180.14 |
| 2018/0072205 A1 | * | 3/2018 | Suarez | B60N 2/2806 |
| 2019/0001851 A1 | * | 1/2019 | Beard | B60N 2/2845 |
| 2021/0078471 A1 | * | 3/2021 | Fujita | B60N 2/58 |
| 2022/0297579 A1 | * | 9/2022 | Nilsson | B60N 2/0021 |

* cited by examiner

*Primary Examiner* — Philip F Gabler
(74) *Attorney, Agent, or Firm* — Barnes & Thornburg LLP (57) ABSTRACT

A juvenile restraint includes a ventilation system and a juvenile seat having a seat bottom and a seat back coupled to the seat bottom to support a child restrained in the juvenile seat. The seat back includes a backrest coupled to the seat bottom and a headrest coupled to the backrest to move up and down relative to the backrest.

10 Claims, 12 Drawing Sheets

FIG. 15

JUVENILE RESTRAINT

PRIORITY CLAIM

This application claims priority under 35 U.S.C. § 119(e) to U.S. Provisional Patent Application No. 63/438,894, filed Jan. 13, 2023, which is expressly incorporated by reference herein in its entirety.

BACKGROUND

The present disclosure relates to a juvenile restraint, and particularly to a juvenile restraint including a juvenile seat. More particularly, the present disclosure relates to a juvenile seat including a seat bottom, a backrest, and a movable headrest.

SUMMARY

According to the present disclosure, a juvenile restraint includes a seat bottom and a seat back coupled to the seat bottom to support a child restrained in the juvenile seat. The seat back includes a backrest coupled to the seat bottom and a headrest coupled to the backrest to move up and down relative to the backrest. The backrest and headrest extend upwardly away from the seat bottom. The headrest is positioned between the backrest and the child restrained in the juvenile seat.

In illustrative embodiments, the juvenile restraint further includes a ventilation system coupled to the headrest to move therewith. The ventilation system includes a headrest fan coupled to the headrest and two torso fans coupled to a different portion of the headrest. The headrest fan and the torso fans are configured to control a headrest airflow and torso airflows across the child restrained in the juvenile seat.

In illustrative embodiments, the headrest includes a headrest body formed to include a head-receiving space for the child's head and a ventilation manifold coupled to the headrest body. The ventilation manifold is positioned between the headrest body and the backrest.

In illustrative embodiments, the ventilation manifold includes an upper fan unit coupled to the headrest body and a lower fan unit located between the upper fan unit and the seat bottom. The upper fan unit is formed to include a headrest inlet, a headrest outlet spaced apart from the headrest inlet, and an upper longitudinally-extending wall interconnecting the headrest inlet and the headrest outlet such that the headrest inlet, the headrest outlet, and the upper longitudinally-extending wall cooperate to provide an upper air passageway that encloses the headrest fan.

In illustrative embodiments, the lower fan unit is formed to include a torso inlet, a torso outlet spaced apart from the torso inlet, and a lower longitudinally-extending wall interconnecting the torso inlet and the torso outlet such that the torso inlet, the torso outlet, and the lower-longitudinally-extending wall cooperate to provide a lower air passageway that encloses the torso fan.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 5 is an exploded view of the headrest of FIG. 4 showing that the ventilation system includes a headrest fan that rotates about a first rotational axis, a first torso fan that rotates about a second rotational axis, and a second torso fan that rotates about a third rotational axis, that the upper fan unit includes a headrest wall formed to include a headrest outlet spaced axially away from the headrest fan, an upper backrest wall formed to include a headrest inlet spaced axially away from the headrest fan, and an upper longitudinally-extending wall interconnecting the headrest wall and the upper backrest wall so that the headrest outlet, the headrest inlet, and the upper longitudinally-extending wall cooperate to define the upper air passageway for a headrest airflow controlled by the headrest fan enclosed in the upper air passageway, and that the lower fan unit includes a torso wall formed to include a first torso outlet spaced axially away from the first torso fan and a second torso outlet spaced axially away from the second torso fan, a lower backrest wall formed to include a first torso inlet spaced axially away from the first torso fan and a second torso inlet spaced axially away from the second torso fan, and a lower longitudinally extending wall and an airflow divider interconnecting the torso wall and the lower backrest wall so that the first torso outlet, the first torso inlet, a portion of the lower longitudinally-extending wall, and a portion of the airflow divider cooperate to define a first lower air passageway of the lower air passageway for a first torso stream of the torso airflow controlled by the first torso fan, and the second torso outlet, the second torso inlet, a portion of the lower longitudinally-extending wall, and a portion of the airflow divider cooperate to define a second lower air passageway for a second torso stream controlled by the second torso fan;

DETAILED DESCRIPTION

Figures 1, 2:
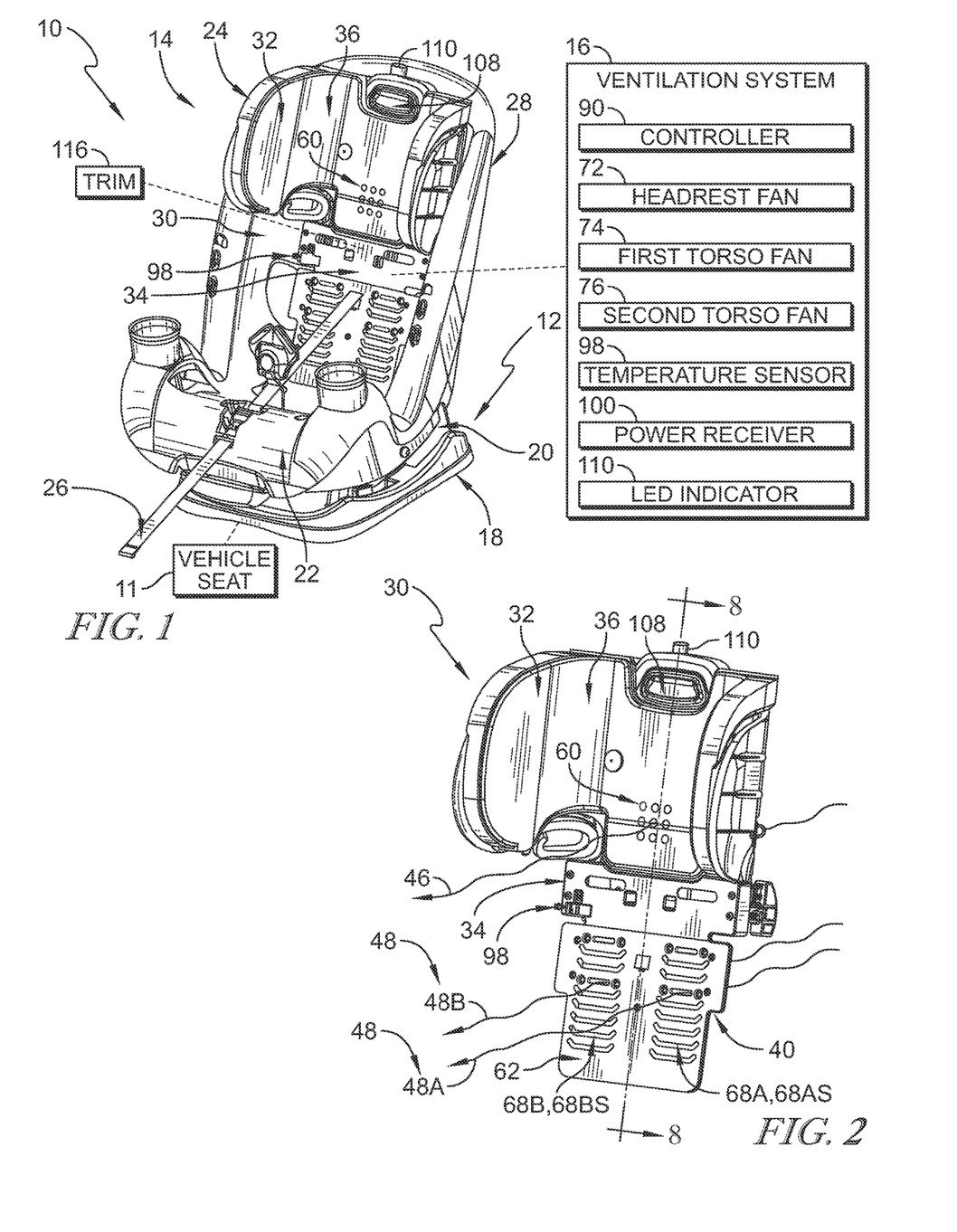
FIG. 1 is a front perspective view of a juvenile restraint including a seat base adapted to rest on a vehicle seat, a juvenile seat coupled to the seat base, and a ventilation system coupled to the juvenile seat and configured to circulate stagnant air behind a child restrained in the juvenile seat and replace the stagnant air with air-conditioned air, the juvenile seat including a seat bottom and a seat back arranged to extend upwardly from the seat bottom, and the seat back including a backrest and a headrest configured to move up and down relative to the backrest and housing components of the ventilation system to move therewith so that the ventilation system can be adjusted to desired locations on the child as the child grows.
FIG. 2 is a front perspective view of the headrest of FIG. 1 showing that the headrest includes a headrest body formed to include a head-receiving space to provide support for a child's head and a ventilation manifold coupled to the headrest body and configured to enclose portions of the ventilation system, and that the ventilation manifold is configured to provide air passageways that direct airflows towards or away from a child restrained in the juvenile seat.

A juvenile restraint 10 includes a seat base 12 adapted to rest on a vehicle seat 11, a juvenile seat 14 coupled to the seat base 12, and a ventilation system 16 coupled to the juvenile seat 14 as shown in FIG. 1. The ventilation system 16 is configured to increase comfort for a child restrained in the juvenile seat 14 by reducing the likelihood of the child sweating while in the juvenile seat 14. The ventilation system 16 is configured to circulate stagnant air behind a child restrained in the juvenile seat 14 and replace the stagnant air with air-conditioned air from a passenger compartment of the vehicle (not shown).

The seat base 12 includes seat base foundation 18 and a juvenile-seat retainer 20 mounted to the seat base foundation 18 to retain the juvenile seat 14 as shown in FIG. 1. The seat base foundation 18 is adapted to rest on the vehicle seat 11. The juvenile-seat retainer 20 is adapted to hold and retain the juvenile seat 14 to the seat base 12.

The juvenile seat 14 includes a seat bottom 22, a seat back 24 arranged to extend upwardly from the seat bottom 22, and a child-restraint harness 26 configured to restrain a child to the juvenile seat 14 as shown in FIG. 1. The seat bottom 22 is configured to attach to the juvenile-seat retainer 20. The seat back 24 is adapted to provide support to a child in the juvenile seat 14.

Figure 3:
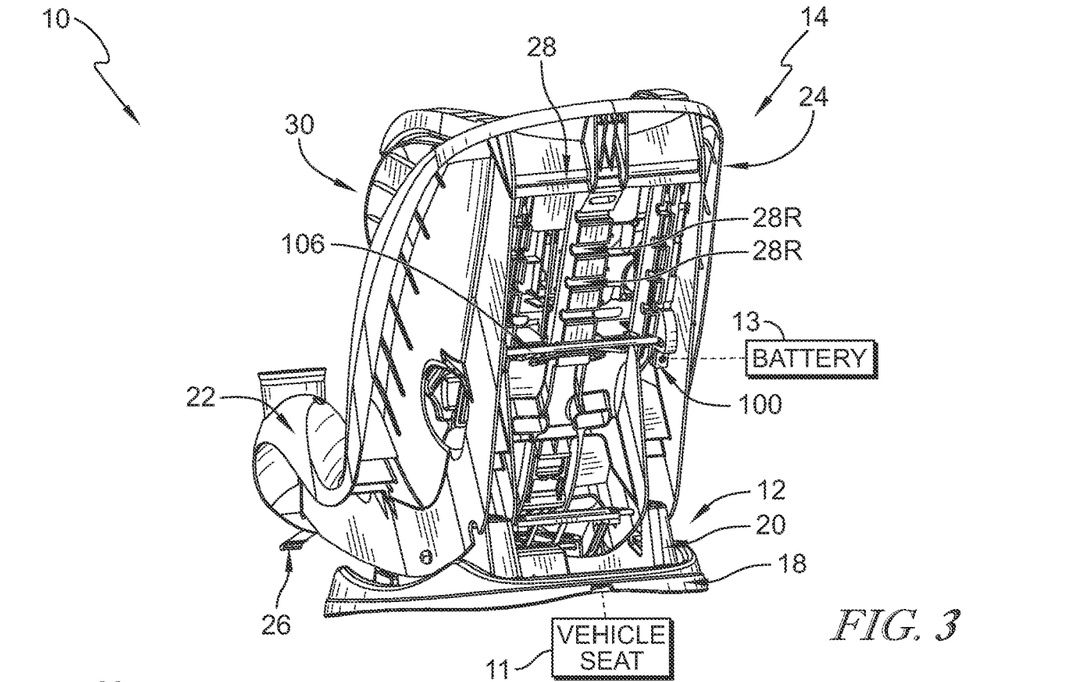
FIG. 3 is a rear perspective view of the juvenile restraint of FIG. 1 showing that the ventilation system includes a power receiver coupled to the ventilation manifold and located longitudinally away from a portion of the backrest so that the power receiver can connect to an external battery, such as a car battery, from behind the juvenile seat.

The seat back 24 includes a backrest 28 and a headrest 30 coupled to the backrest 28 as shown in FIGS. 1 and 3. The backrest 28 is coupled to the seat bottom 22 and extends upwardly away from the seat bottom 22. The headrest 30 is coupled to the backrest 28 and is configured to slide upwardly and downwardly along the backrest 28 to adjust the height of the headrest 30 relative to the seat bottom 22.

The headrest 30 includes a headrest body 32 and a ventilation manifold 34 as shown in FIGS. 1-4. The headrest body 32 is coupled to the ventilation manifold 34 and is formed to include a head-receiving space 36 to provide support for a child's head. The ventilation manifold 34 is coupled to the backrest 28 and encloses portions of the ventilation system 16 as described in further detail below. The headrest 30, including portions of the ventilation system 16 enclosed in the ventilation manifold 34, is movable relative to the backrest 28 as described in further detail below. As such, the ventilation system 16 may circulate stagnant air behind a child restrained in the juvenile seat 14 as the headrest 30 is adjusted for the child's height.

Figure 4:
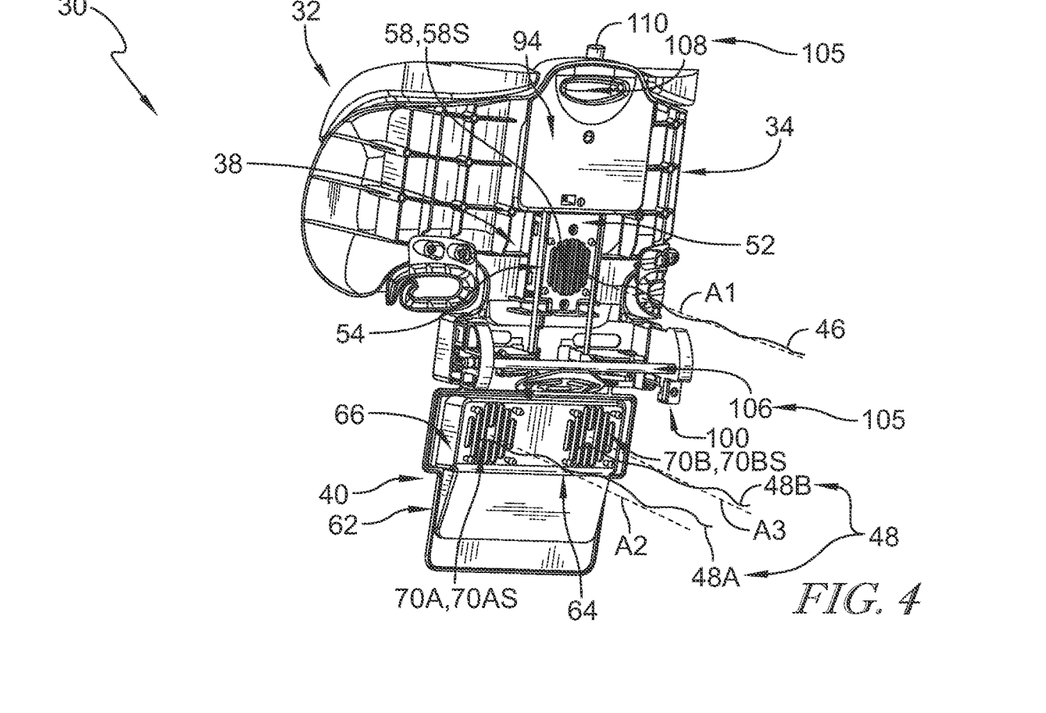
FIG. 4 is a rear perspective view of the headrest of FIGS. 1-3 showing that the ventilation manifold includes an upper fan unit that defines an upper air passageway for a headrest airflow and a lower fan unit that defines a lower air passageway for a torso airflow.
Figure 5:
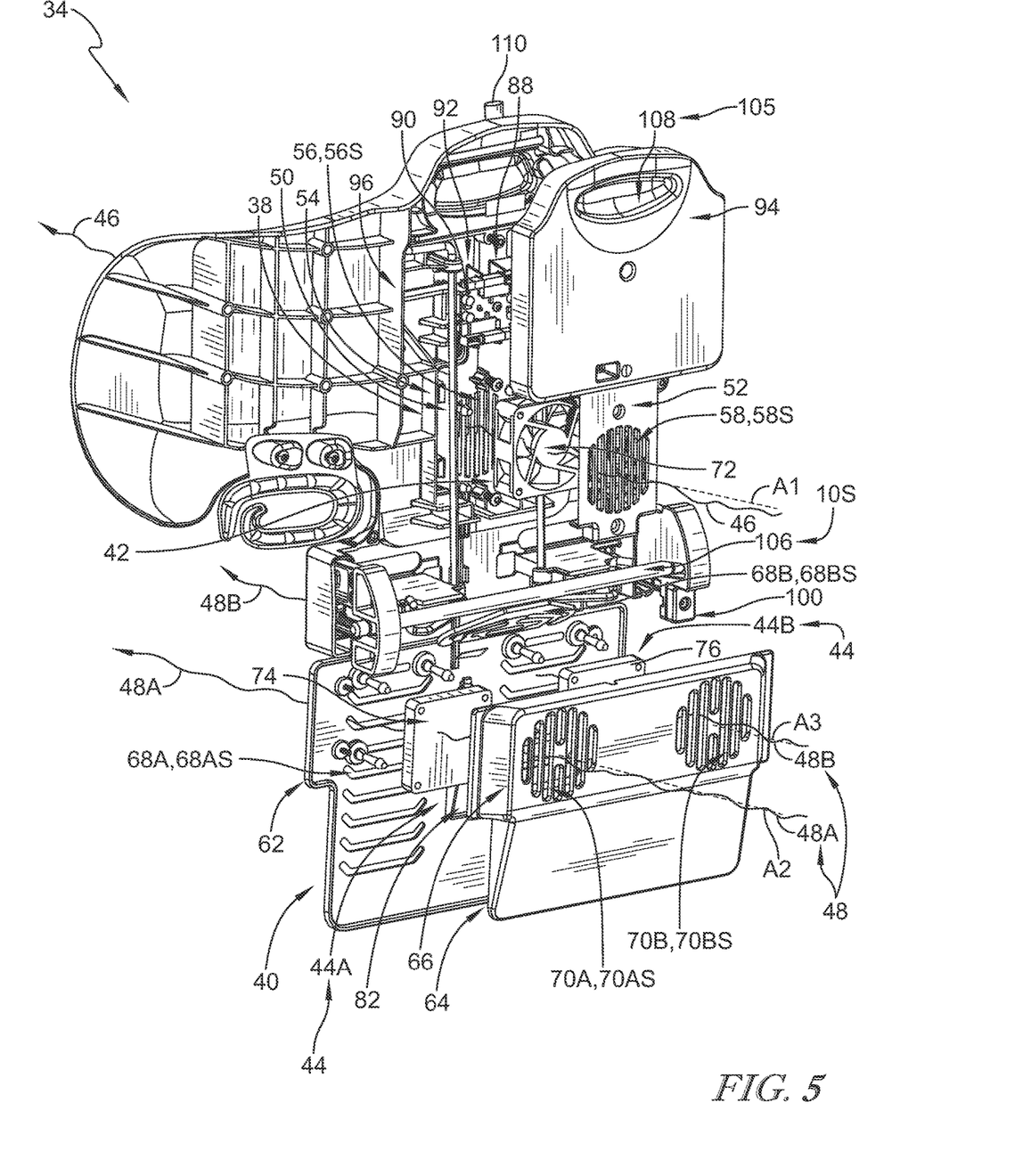

The ventilation manifold 34 includes an upper fan unit 38 coupled to the headrest body 32 and a lower fan unit 40 coupled to the upper fan unit 38 as shown in FIGS. 4 and 5. The lower fan unit 40 extends downwardly away from the upper fan unit 38 toward the seat bottom 22. The upper fan unit 38 and the lower fan unit 40 are each configured to provide air passageways 42, 44 that direct airflows 46, 48 towards or away from a child restrained in the juvenile seat 14.

The upper fan unit 38 includes a headrest wall 50, an upper backrest wall 52 spaced apart longitudinally away from the headrest wall 50, and an upper longitudinally-extending wall 54 interconnecting the headrest wall 50 and the upper backrest wall 52 as shown in FIGS. 4-6 and 8. The headrest wall 50 is formed to include a headrest outlet 56 and the upper backrest wall 48 is formed to include a headrest inlet 58 so that the headrest outlet 56, the upper longitudinally-extending wall 54, and the headrest inlet 58 cooperate to define the upper air passageway 42 for the headrest airflow 46. The ventilation system 16 may either move the headrest airflow 46 toward the child or move the headrest airflow 46 away from the child such that the terms inlet and outlet may be used interchangeably.

Figure 11:
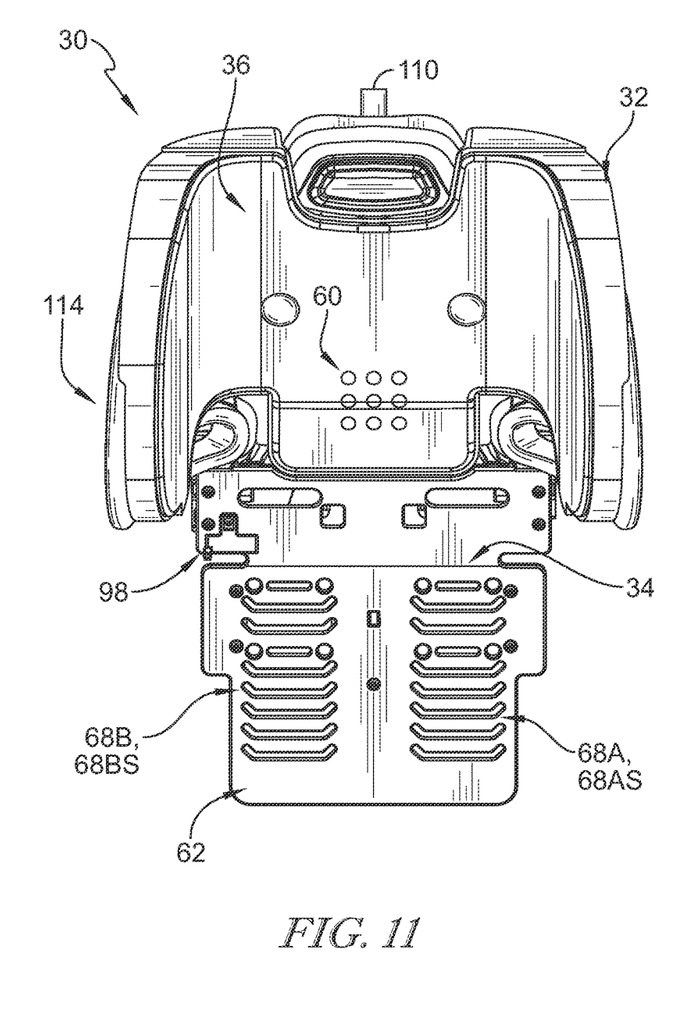
FIG. 11 is a front elevation view of the headrest and headrest-height controller of FIG. 2 showing that the headrest body is formed to include a series of apertures that cooperate with the upper fan unit to provide the upper air passageway, the series of apertures forming a grid pattern to provide even distribution of the headrest airflow to the child's head, neck, or upper shoulders.

The upper air passageway 42 is further provided by a series of apertures 60 formed in the headrest body 32 as shown in FIGS. 2 and 11. In one illustrative embodiment, the series of apertures 60 are circular apertures that form a grid pattern to provide even distribution of the headrest airflow 46 to the child's head, neck, or upper shoulders as for minimizing the impact of foreign material moving through the apertures such as dust, dirt, or any other undesirable material. In other embodiments, the series of apertures 60 may comprise one or more sections of any variety of suitable shapes, including but not limited to circular, rectangular, and triangular, so long as air may flow therethrough.

The lower fan unit 40 includes a torso wall 62, a lower backrest wall 64 spaced apart longitudinally away from the torso wall 62, and a lower longitudinally-extending wall 66 interconnecting the torso wall 62 and the lower backrest wall 64 as shown in FIGS. 2, 4, 5, 7, and 8. The torso wall 62 is formed to include a first torso outlet 68A and a second torso outlet 68B spaced apart laterally from the first torso outlet 68A, and the lower backrest wall 64 is formed to include a first torso inlet 70A and a second torso inlet 70B spaced apart laterally from the first torso inlet 70A. The torso outlets 68A, 68B, the torso inlets 70A, 70B, and the lower longitudinally-extending wall 66 cooperate to define the lower air passageway 44 for the torso airflow 48. The ventilation system 16 may either move the torso airflow 48 toward the child or move the torso airflow 48 away from the child such that the terms inlet and outlet may be used interchangeably.

The ventilation system 16 includes a headrest fan 72 that rotates about a first rotational axis A1, a first torso fan 74 that rotates about a second rotational axis A2, and a second torso fan 76 that rotates about a third rotational axis A3 as shown in FIGS. 4-7. The headrest fan 72 is coupled to the upper fan unit 38 and is configured to control the headrest airflow 46, while the first and second torso fans 74, 76 are coupled to the lower fan unit 40 and are configured to control the torso airflow 48. In the illustrative embodiment, the first rotational axis A1 extends longitudinally through the upper fan unit 38 relative to the seat bottom 22, and the second rotational axis A2 and the third rotational axis A3 extend longitudinally through the lower fan unit 40 relative to the seat bottom 22. The second rotational axis A2 and the third rotational axis A3 are both laterally offset from the first rotational axis A1 such that the first rotational axis A1 is located between the second and third rotational axes A2 and A3. The second and third rotational axes A2 and A3 are generally parallel to each other such that the second rotational axis A2 and the third rotational axis A3 are arranged to lie on a plane. In other embodiments, the ventilation system 16 may include any combination of fans coupled to the upper fan unit 38, the lower fan unit 40, or anywhere else on the ventilation manifold 34.

Figure 9:
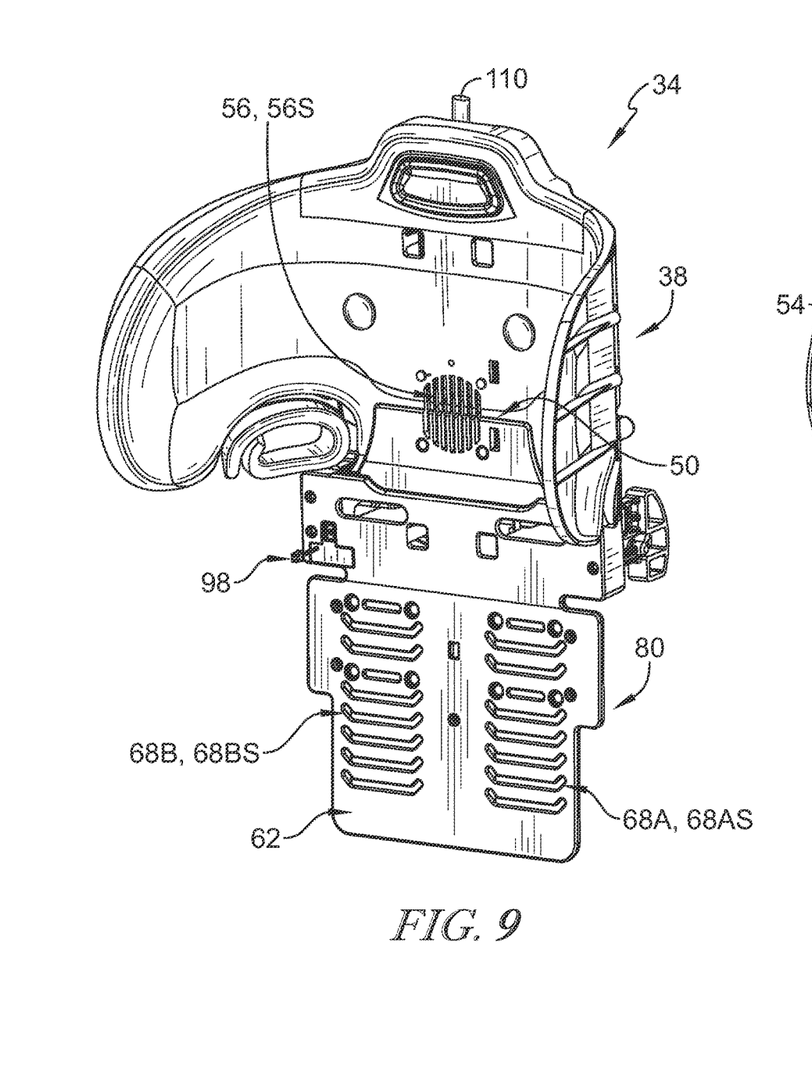
FIG. 9 is a front perspective view of the ventilation manifold of FIG. 2 showing that the headrest outlet is formed by a series of spaced-apart slots arranged vertically relative to the first rotational axis to streamline the headrest airflow through the upper air passageway towards or away from the child's head, neck, or shoulders, and showing that the first and second torso inlets are formed by separate series of spaced-apart slots that are arranged to extend laterally relative to the second and third rotational axes and each slot being spaced apart vertically from each other down the height of the torso wall to distribute the torso airflow across the height of the child's torso or draw the torso airflow away from the height of the child's torso.
Figure 10:
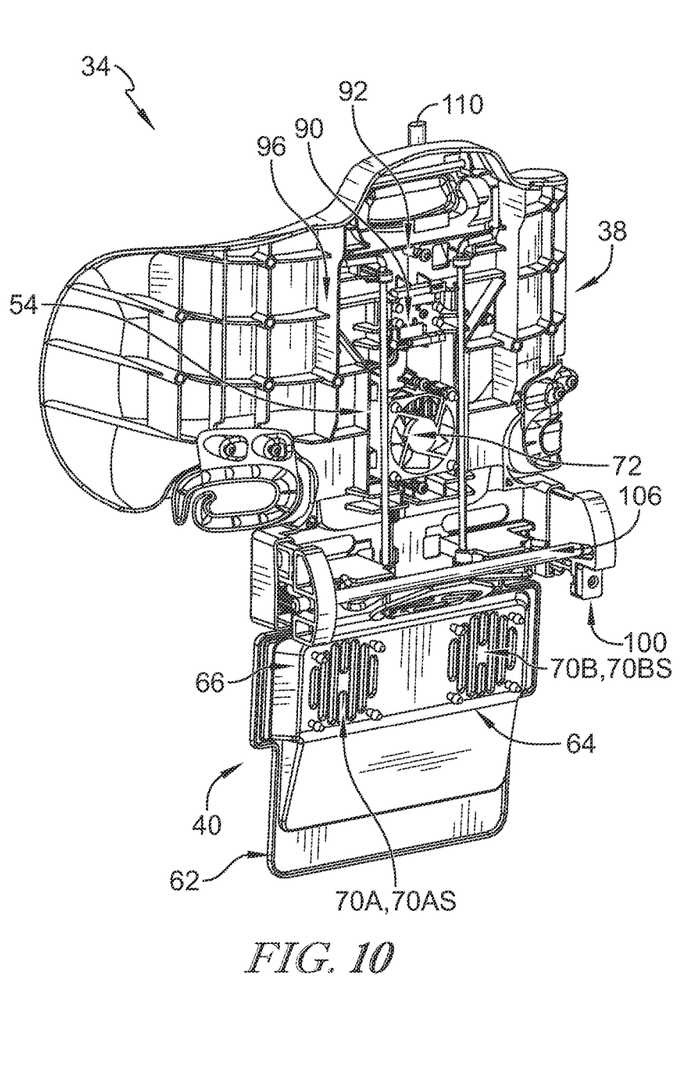
FIG. 10 is a rear perspective view of the ventilation manifold and the headrest-height controller of FIG. 9 showing that the torso outlets are formed by a series of spaced-apart slots arranged vertically relative to the second and third rotational axes to streamline the torso airflow through the lower air passageway into and out of the lower fan unit.
Figure 12:
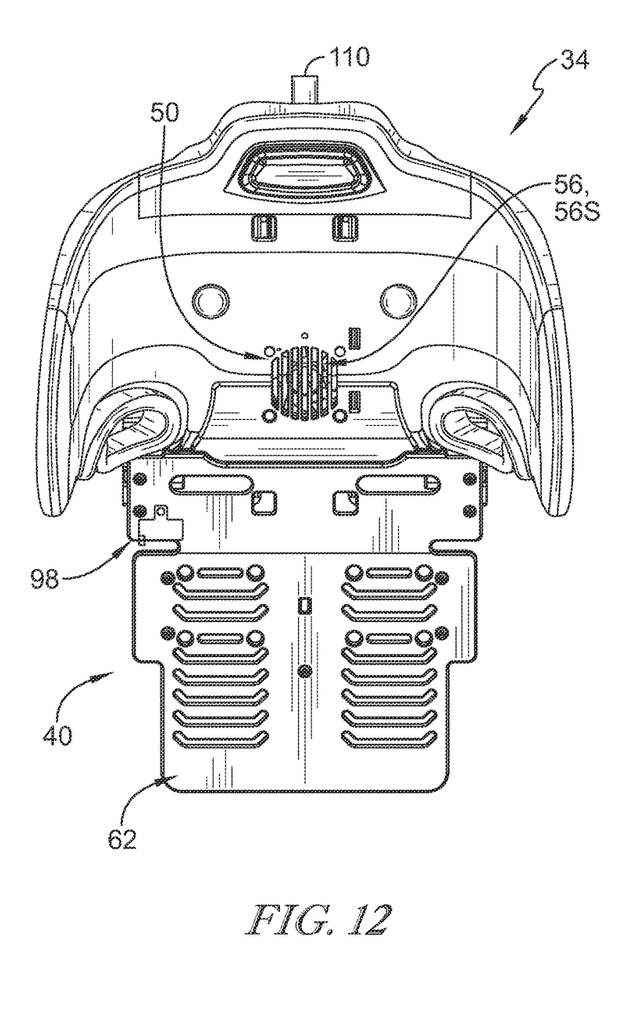
FIG. 12 is a front elevation view of the ventilation manifold and the headrest-height controller of FIG. 11.

Referring back to the ventilation manifold 34 shown in FIGS. 9 and 12, the headrest outlet 56 is formed by a first series of spaced-apart slots 56S arranged vertically relative to the first rotational axis A1. Likewise, the headrest inlet 58 is formed by a second series of spaced-apart slots 58S arranged vertically relative to the first rotational axis A1 as shown in FIGS. 4, 5, 6, and 13. In the illustrative embodiment, the slots 56S, 58S are generally rectangular with rounded edges forming a circular shape around the first rotational axis A1. Such an arrangement of the slots 56S, 58S streamlines headrest airflow 46 through the upper air passageway 42 towards or away from the child's head, neck, or shoulders and limits the intrusion of un-intended material into the airflow. In other embodiments, the slots 56S, 58S may comprise one or more sections of any variety of suitable shapes, including but not limited to circular, rectangular, and triangular, so long as air may flow therethrough.

The first torso outlet 68A and the second torso outlet 68B are each formed by a third and fourth series of spaced-apart slots 68AS, 68BS as shown in FIGS. 2, 7, 9, 11, and 12. The third and fourth series of spaced-apart slots 68AS, 68BS are arranged to extend laterally relative to the second and third rotational axes A2, A3. Each slot 68AS, 68BS in a respective series being spaced-apart vertically from each other down a height 62H of the torso wall 62 relative to the seat bottom 22. In the illustrative embodiment, the slots 68AS, 68BS are generally rectangular with winged edges forming a rectangular shape extending downward from the second and third rotational axes A2, A3. Such an arrangement of the slots 68A, 68BS distributes the torso airflow 48 across the height of the child's torso or draw the torso airflow 48 away from the height of the child's torso. In other embodiments, the slots 68AS, 68BS may comprise one or more sections of any variety of suitable shapes, including but not limited to circular, rectangular, and triangular, so long as air may flow therethrough.

Figure 7:
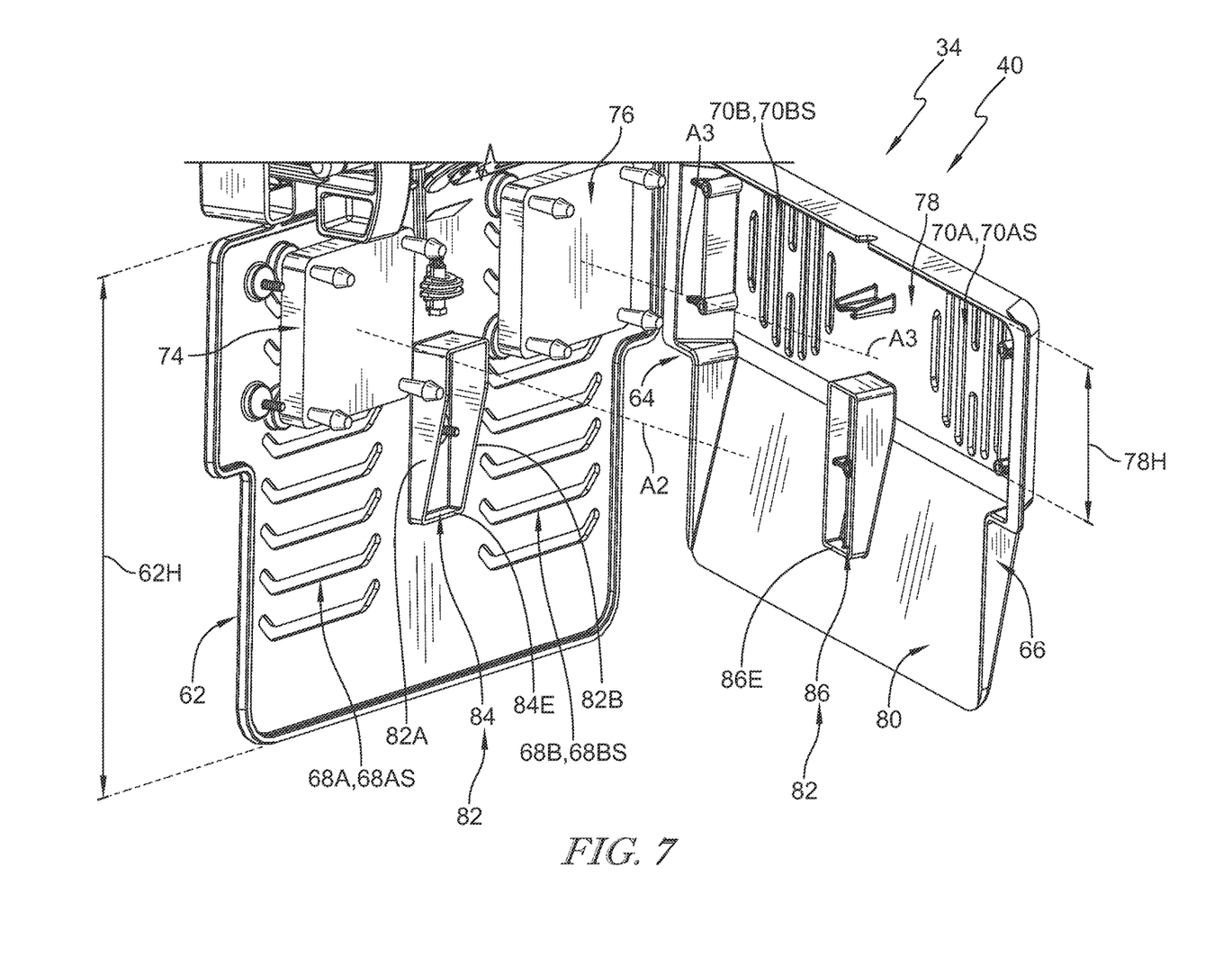
FIG. 7 is an enlarged view of a portion of FIG. 4 with the lower backrest wall partially separated from torso wall showing that the torso wall has a first height and that the lower backrest wall includes an inlet surface having a second height less than a first height and an airflow surface that extends downwardly from the inlet surface and towards the torso wall at an angle to encourage airflow across the height of the torso wall.
Figure 8:
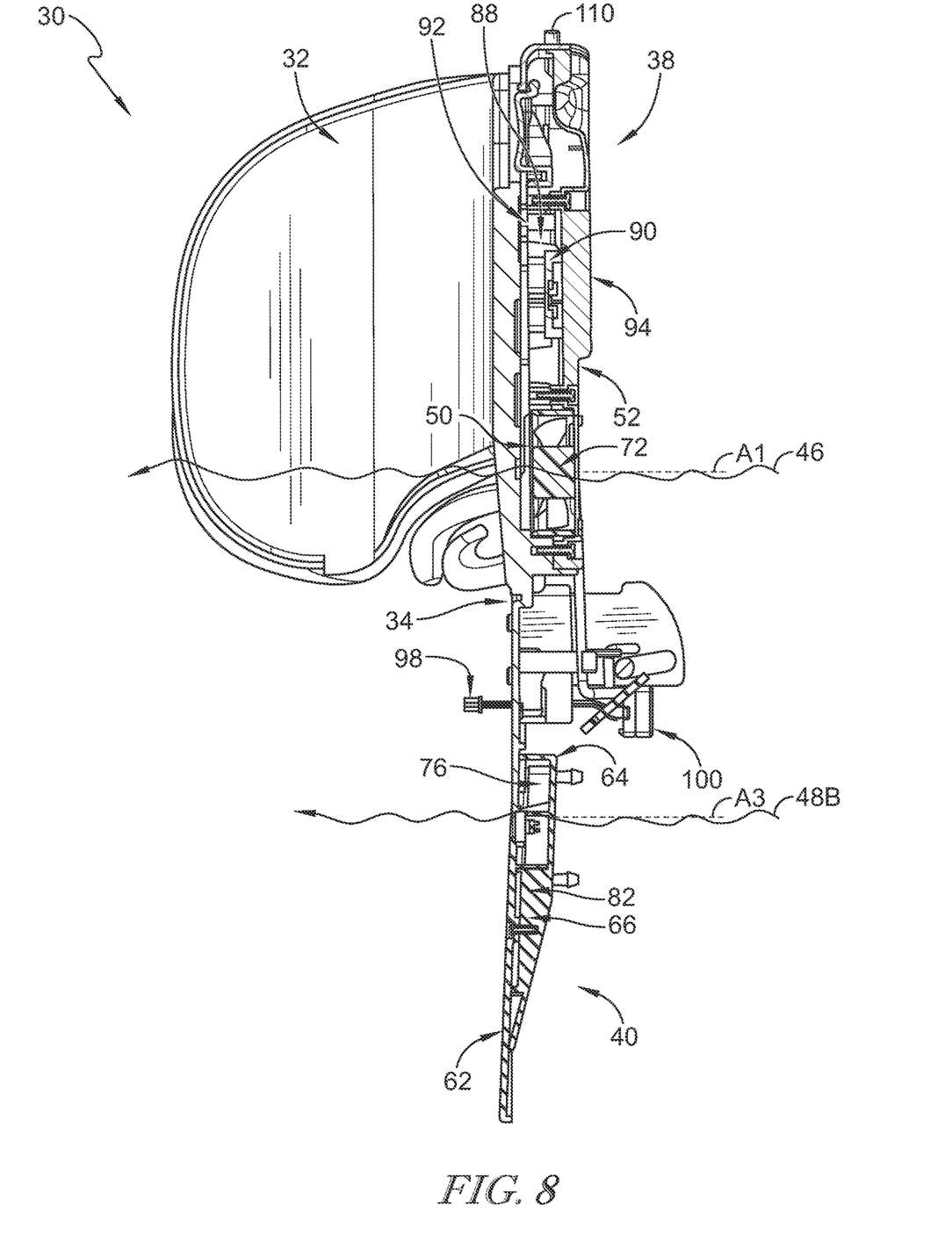
FIG. 8 is a cross section taken along line 8-8 in FIG. 2 showing that at least the controller and the fans of the ventilation system are enclosed by the ventilation manifold to move therewith, and that the power receiver, a temperature sensor of the ventilation system, and an LED indicator of the ventilation system are coupled to the ventilation manifold to move therewith.

The lower backrest wall 64 includes an inlet surface 78 and an airflow surface 80 that extends downward from the inlet surface 78 as shown in FIGS. 7 and 8. The inlet surface 78 is generally parallel to the torso wall 62 and has a height 78H that is less than the torso wall height 62H. The airflow surface 80 is arranged to extend longitudinally towards the torso wall 62 to cooperate with the inlet surface 78, the torso wall 62, and the lower longitudinally-extending wall 66 to form the lower air passageway 44. In the illustrative embodiment, the airflow surface 80 extends at about a 45 degree angle between the inlet surface 78 and the torso wall 62 to encourage airflow across most or all of the height of the first and second torso outlets 68A, 68B. In other embodiments, the airflow surface 80 may extend at any angle between the inlet surface 78 and the torso wall 62 so long as air may flow therethrough.

The first torso inlet 70A and the second torso inlet 70B are each formed by a fifth and sixth series of spaced apart slots 70AS, 70BS as shown in FIGS. 4, 5, 7, 10, 13, and 14. The fifth and sixth series of spaced-apart slots 70AS, 70BS are arranged vertically relative to the second and third rotational axis A2, A3. In the illustrative embodiment, the slots 70AS, 70BS are generally rectangular with rounded edges forming a circular shape around the respective second and third rotational axes A2, A3. Such an arrangement of the slots 70AS, 70BS streamlines the torso airflow 48 into or out of the lower fan unit 40. In other embodiments, the slots 70AS, 70BS may comprise one or more sections of any variety of suitable shapes, including but not limited to circular, rectangular, and triangular, so long as air may flow therethrough.

The lower fan unit 40 further includes an airflow divider 82 configured to separate the torso airflow 48 into a first torso stream 48A and second torso stream 48B as shown in FIGS. 7 and 8. The lower air passageway 44 therefore includes a first lower air passageway 44A and a second lower air passageway 44B. Accordingly, a first side 82A of the airflow divider 82 cooperates with the first torso inlet 70A, the first torso outlet 68A, a portion of the airflow surface 80, and a portion of the lower longitudinally-extending wall 66 to provide the first lower air passageway 44A for the first torso stream 48A. Likewise, a second side 82B of the airflow divider 82 cooperates with the second torso inlet 70B, the second torso outlet 68B, a portion of the airflow surface 80, and a portion of the lower longitudinally-extending wall 66 to provide the second lower air passageway 44B for the second torso stream 48B.

In the illustrative embodiment, the airflow divider 82 includes a divider receiver 84 coupled to the torso wall 62 and a divider mount 86 coupled to the lower backrest wall 64 as shown in FIG. 7. When the divider receiver 84 and the divider mount 86 are interconnected, the airflow divider 82 extends longitudinally between and interconnects the torso wall 62 and the lower backrest wall 64. The divider receiver 84 includes a backrest-wall edge 84E that matches the shape of the lower backrest wall 64 and the divider mount 86 includes a torso-wall edge 86E that matches the shape of the torso wall 62 so that, when assembled, the divider receiver 84 and the divider mount 86 establish a continuous connection between the torso wall 62 and the lower backrest wall 64. In other embodiments, the airflow divider 82 may be coupled to only one of the torso wall 62 and the lower backrest wall 64 so long as the airflow divider 82 cooperates with other lower fan unit 40 components to establish two or more air passageways 44A, 44B. The airflow divider 82 is also configured to provide longitudinal support to the lower fan unit 40 to prevent the lower backrest wall 64 from collapsing towards the torso wall 62.

Referring to FIGS. 5, 6, 10, and 14, the upper fan unit 38 further includes a controller-receiving space 88 configured to hold a controller 90 of the ventilation system 16 as described in further detail below. The controller-receiving space 88 is defined by a headrest-controller wall 92, a backrest-controller wall 94, and a longitudinally extending-controller wall 96. The headrest-controller wall 92 is coupled to and extends upwardly away from the headrest wall 50. The backrest-controller wall 94 is coupled to and extends upwardly away from the upper backrest wall 52. The longitudinally extending-controller wall 96 is coupled to the headrest-controller wall 92 and interconnects the headrest-controller wall 92 and the backrest-controller wall 94. In other embodiments, the longitudinally extending-controller wall 96 may also be coupled to or only be coupled to the backrest-controller wall 94.

Returning to the ventilation system 16, the ventilation system 16 is movable with the headrest 30 so that the components of the ventilation system 16 can be located near appropriate areas of the child as the child grows. The ventilation system 16 includes the controller 90, the fans 72, 74, 76, a temperature sensor 98 coupled to the backrest 28 or the headrest 30, and a power receiver 100 coupled to the seat back 24 as shown in FIGS. 5 and 8. The fans 72, 74, 76, and the temperature sensor 98 are communicatively coupled to the controller 90. The controller 90 includes a processor 102 and a memory 104 storing instructions that, when executed by the processor 102, cause one or more of the fans 72, 74, 76, to change in speed based on a difference between a pre-determined temperature stored on the memory 104 and the actual temperature behind a child in the juvenile seat 14 detected by the temperature sensor 98. In one example, the controller 90 is comprised within a printed circuit board (PCB) enclosed in the controller-receiving space 88. In other embodiments, the controller 90 may be any device, computer, or system configured to store and execute instructions to cause the one or more fans 72, 74, 76, to change in speed, and may be coupled to anywhere else on the headrest 30. The temperature sensor 98 may be coupled to the seat back 24, backrest 28 and/or headrest 30 anywhere heat between the child and the seat back 24 is likely to accumulate.

The ventilation system 16 includes the headrest fan 72, the first torso fan 74, and the second torso fan 76 as shown in FIG. 5. The headrest fan 72 is enclosed in the upper air passageway 42 between the headrest inlet 58 and the headrest outlet 56 so that the headrest airflow 46 may flow therethrough. Similarly, the first torso fan 74 is enclosed in the first lower air passageway 44A between the first torso inlet 70A and the first torso outlet 68A so that the first torso stream 48A of the torso airflow 48 may flow therethrough. The second torso fan 76 is enclosed in the second lower air passageway 44B between the second torso inlet 70B and the second torso outlet 68B so that the second torso stream 48B of the torso airflow 48 may flow therethrough. are coupled to and located between the backrest 28 and the headrest body 32. In some embodiments, additional fans may be located in the backrest 28.

The fans 72, 74, 76, may be configured to direct airflow away from the child so that warm stagnant air can be directed away from the child. Alternatively, the fans 72, 74, 76, may be configured to direct airflow towards the child so that air-conditioned air from the vehicle compartment can cool the stagnant air behind the child. In other embodiments, one or more of the fans 72, 74, 76, may be configured to direct airflow away from the child while one or more of the other fans 72, 74, 76, may be configured to direct airflow towards the child. In some embodiments, the controller 90 may be configured to cause the direction of one or more of the fans 72, 74, 76, to change.

When the temperature sensor 98 detects a temperature higher than the pre-determined temperature, the controller 90 increases the speed of one or more of the fans 72, 74, 76. Increasing the speed of one or more of the fans 72, 74, 76, reduces or eliminates any heat or humidity accumulated in the stagnant air between the child's body in the juvenile seat 14 and the seat back 24, therefore reducing the likelihood of the child sweating in the juvenile seat 14. When the temperature sensor 98 detects a temperature lower than the pre-determined temperature, the controller 90 decreases the speed of one or more of the fans 72, 74, 76, to allow the area between the child's body and the seat back 24 to warm. The pre-determined temperature may be set by a manufacturer or a caregiver.

Referring to the seat back 24, the seat back 24 includes the backrest 28, the headrest 30, and further includes a headrest-height controller 105 coupled to the headrest 30 as shown in FIGS. 4, 5, 13, and 15. The backrest 28 is formed to include a plurality of recesses 28R that each extend laterally relative to the seat bottom 22 and are spaced apart longitudinally from each other between the seat bottom 22 and a top of the headrest 30. The headrest-height controller 105 is configured to move the headrest 30 and the ventilation system 16 relative to the backrest 28 as the child grows.

Figure 13:
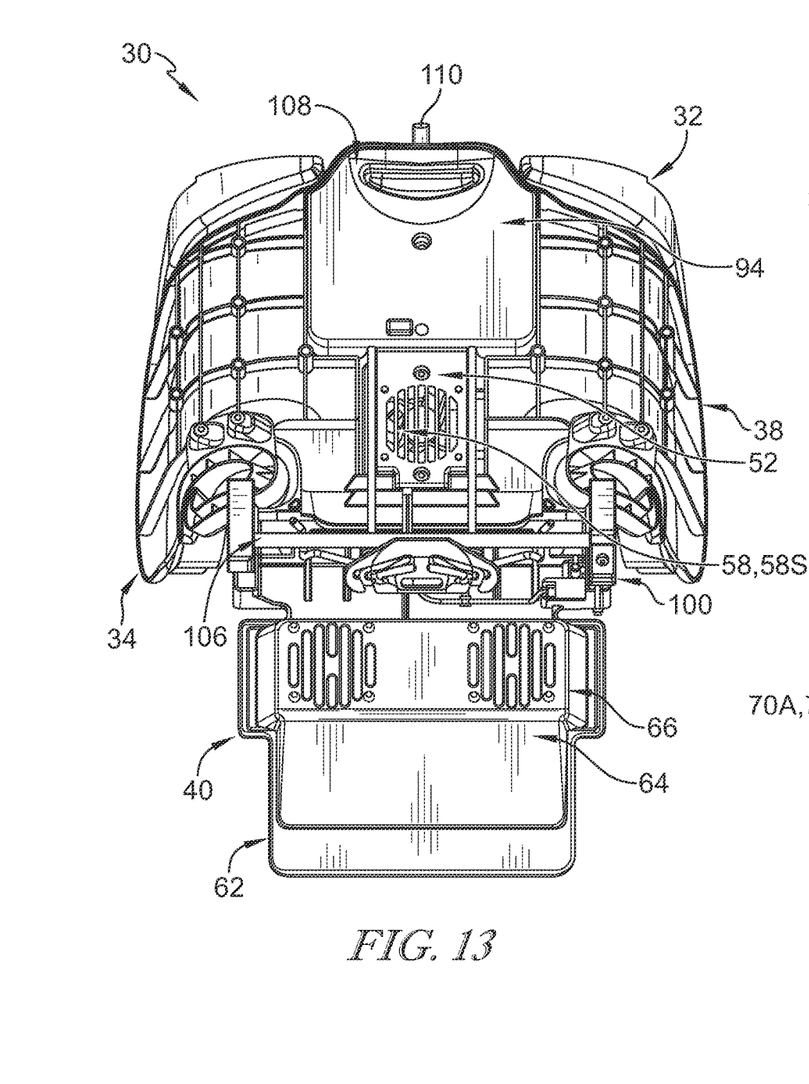
FIG. 13 is a rear elevation view of the headrest of FIG. 4 showing that the headrest is coupled to a headrest-height controller configured to move the headrest and the ventilation system, the headrest-height controller including a headrest lock coupled to a lower end of the headrest wall and a headrest-lock actuator coupled to a top of the headrest that, when activated by a caregiver, allows the caregiver to move the headrest by movement of the headrest lock.
Figure 14:
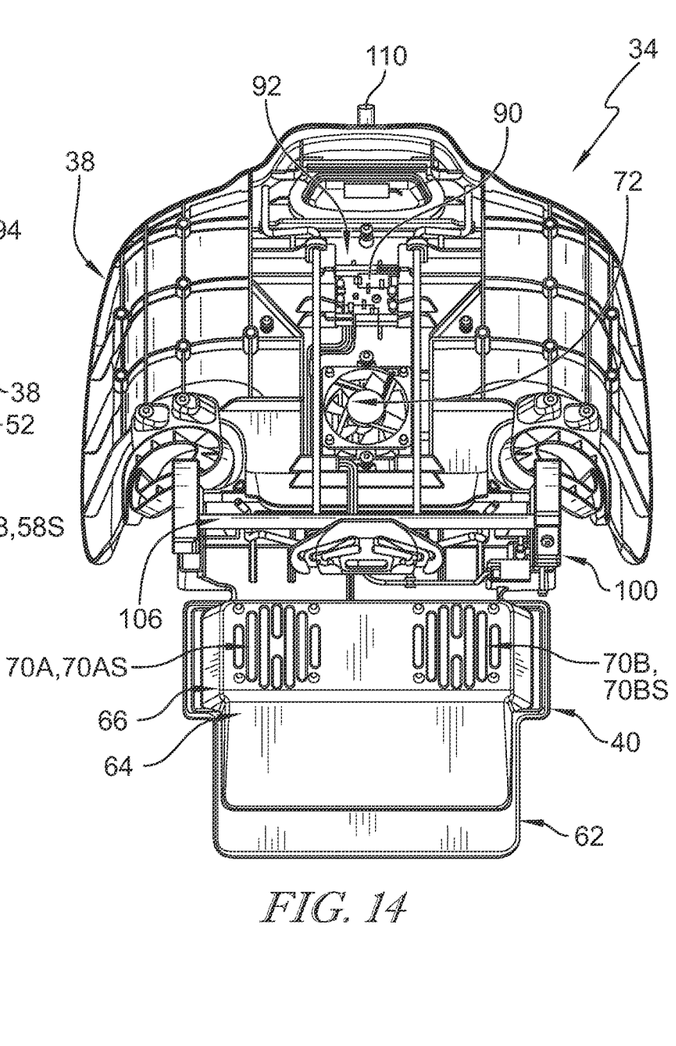
FIG. 14 is a rear elevation view of the ventilation manifold of FIG. 13.
Figure 15:
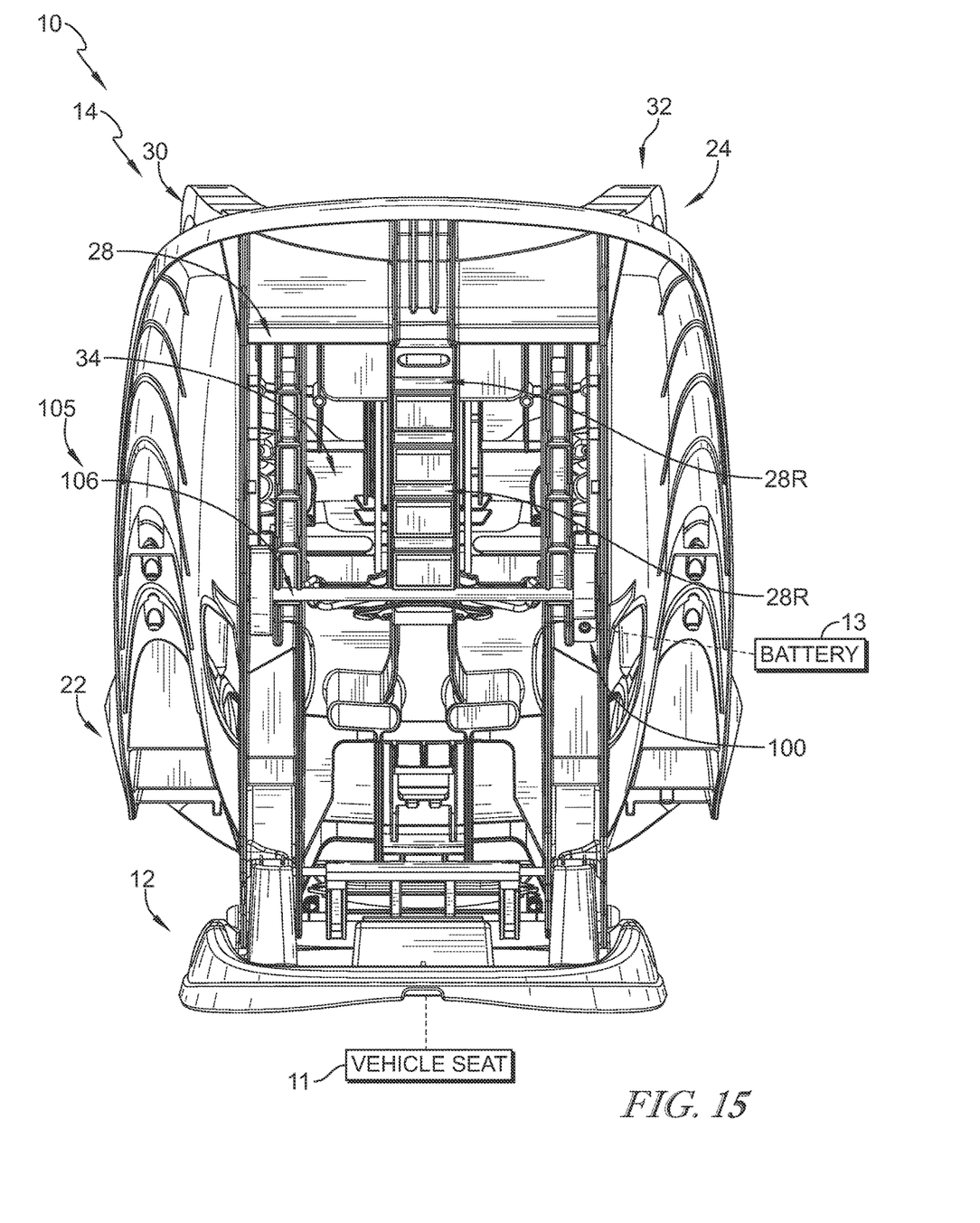
FIG. 15 is a rear elevation view of the juvenile restraint of FIGS. 1 and 3 showing that the backrest is formed to include a plurality of recesses that each extend laterally relative to the seat bottom and are configured to receive the headrest lock, and showing that the plurality of recesses are spaced apart longitudinally from each other between the seat bottom and the top of the headrest so that, when the headrest-lock actuator is activated by a caregiver, the headrest lock can move to a different recess to establish a different height of the headrest.

The headrest-height controller 105 includes a headrest lock 106 coupled to a lower end of the headrest wall 50 and a headrest-lock actuator 108 coupled to a top of the headrest 30. The headrest lock 106 is configured to be received in one of the plurality of recesses 28R formed in or coupled to the backrest to establish a height of the headrest 30. The headrest-lock actuator 108 is configured to be activated by a caregiver. When activated by a caregiver, the headrest-lock 106 permits the caregiver to move the headrest lock 106 to a different one of the plurality of recesses 28R to adjust the height of the headrest 30. Accordingly, the fans 72, 74, 76, of the ventilation system 16, which are coupled to the headrest 30, may be moved to coordinate with a desired location on the child.

The backrest 28, for example, is formed to include a first pair of vertically extending slots that are adapted to receive belts of a child-restraint harness included in the juvenile restraint. These slots allow for the harness belts to be routed over the child in the front through the headrest and backrest to a back side of the backrest. The backrest 28 is further formed to include, for example, a second pair of vertically extending slots that are configured to allow portions of the headrest-height controller to extend from the front side of the backrest 28 to the rear side of the backrest 28 and allow engagement or disengagement with the plurality of recesses 28R.

In one example, the ventilation manifold and the fans 72, 74, and 76 are all located forward of a front or front surface of the backrest. The power receiver 100 of the ventilation system 16, for example, is located rearward of a rear surface of the backrest. The front surface of the backrest is arranged to face toward the child restrained by the juvenile restraint while the rear surface is arranged to face opposite the front surface. In this example, power is provided to the power receiver 100 and moves from the power receiver 100 through one of the second pair of vertically extending slots to the controller and fans.

Returning to the ventilation system 16, as shown in FIGS. 2 and 15, the power receiver 100 is coupled to an outer lateral end of the headrest lock 106 and is arranged to be located longitudinally away from at least one recess of the plurality of recesses 28R. Thus, the power receiver 100 is accessible by a caregiver from behind the seat back 24 when the headrest lock 106 is received in any of the plurality of recesses 28R. In the illustrative embodiment, the power receiver 100 is a power socket. In other embodiments, the power receiver 100 may be any device configured to receive power from an external battery.

The ventilation system 16 further includes an LED indicator 110 coupled to the backrest 28 and/or headrest 30 and communicatively coupled to the controller 90, and the power receiver 100 is adapted to connect the ventilation system 16 to a power source 13. In on example, the power source 13 is a battery 13 of the vehicle or a standalone battery included in the child restraint 10. The LED indicator 110 is configured to communicate the power status of the ventilation system 16 to a caregiver of the child. The power receiver 100 is adapted to power the ventilation system 16 with the vehicle battery 13. Accordingly, the controller 90 may further include instructions that senses the voltage and/or power of the battery 13 and causes the ventilation system 16 to provide no power to at least one of the controller 90, the fans 72, 74, 76, or other components of the ventilation system 16 when the vehicle is turned off (e.g., when the charging system is not charging the vehicle battery 13) to prevent battery drainage. The ventilation system 16 may operate on a standard 12V vehicle battery 13 and/or a standalone battery.

Figure 6:
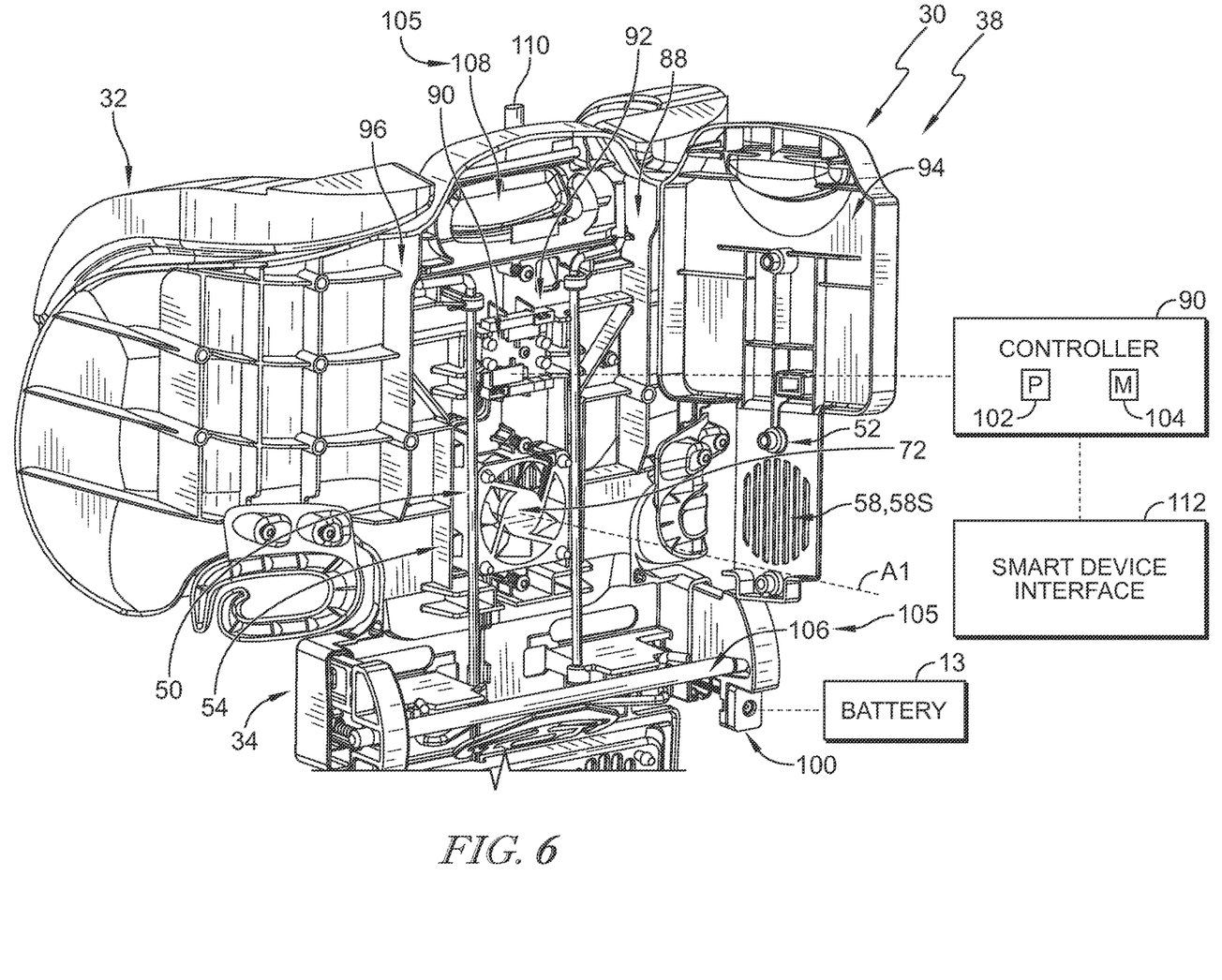
FIG. 6 is an enlarged view of a portion of FIG. 4 with the upper backrest wall and a backrest-controller wall coupled to the upper backrest wall partially separated from the rest of the ventilation manifold showing that the headrest fan is coupled to the headrest wall and that the upper fan unit further includes a controller-receiving space configured to hold a controller of the ventilation system, the controller-receiving space being defined by the backrest-controller wall, a headrest-controller wall coupled to the headrest wall, and a longitudinally extending-controller wall interconnecting the headrest-controller wall and the backrest-controller wall so that the controller is movable with the headrest.

Optionally, the ventilation system 16 may further comprise a smart device interface 112 as shown diagrammatically in FIG. 6. The smart device interface 112 may be communicatively coupled to the controller 90 and adapted to display an index representing the comfort level of the child in the juvenile seat 14 and/or the power status of the system 16. In electric vehicles where the voltage is generally steady at 12V regardless of whether the vehicle is running or not, the controller 90 includes instructions to automatically provide no power to one or more components of the ventilation system 16 may be overridden with the smart device interface 112. If the ventilation system 16 detects that the vehicle is turned off and/or that the vehicle has been stationary for a period of time, the controller 90 may be configured to send a message to the smart device interface asking for confirmation to keep the ventilation system 16 running. If there is a negative confirmation or no confirmation, the ventilation system 16 may provide no power to one or more components of the ventilation system 16. Additionally, the smart device interface 112 may be adapted to allow the caregiver to adjust the pre-determined temperature. In the illustrative embodiment, the smart device interface 112 is on a mobile device. Additionally or alternatively, the smart device interface 112 may be a touch-screen coupled to the rear or side of the juvenile seat 14.

While the ventilation system 16 is comprised within the seat back 24 of the juvenile seat 14, other embodiments may include some or all components of the ventilation system 16 comprised within the seat bottom 22 and/or the seat back 24. For example, some or all of the fans 72, 74, 76, or additional fans may be coupled to the seat bottom 22, the backrest 28, or wings 114 of the headrest 30.

The juvenile seat 14 may further include trim 116, shown diagrammatically in FIG. 1, to provide cushioning between the headrest 30 and the child restrained in the juvenile seat 14. The trim 116 may be made of a breathable material which allows for the headrest airflow 46 and the torso airflow 48 to pass through the trim 116 away from or towards the child.

Juvenile seat headrests with deeper side wings and padded with foam have come from increasing frontal and side-impact testing. As a result, an area of stagnant air behind the child has become more common, this stagnant air commonly heated up more by the child's bodyheat. The end result is a sweaty seat back 24. The juvenile restraint 10 of the present disclosure is designed to dissipate the heat accumulated behind the child by promoting the air circulation in this stagnant space.

FIGS. 16-19 show a second embodiment of the juvenile restraint 210 of the present disclosure. The juvenile restraint 210 is substantially similar to the juvenile restraint 10 except where otherwise indicated. Accordingly, the disclosure of the juvenile restraint 10 is incorporated by reference herein. The juvenile restraint 210 includes a juvenile seat 214 having a seat back 224 adapted to provide support to a child in the juvenile seat 214 and houses the ventilation system 216.

Figure 16:
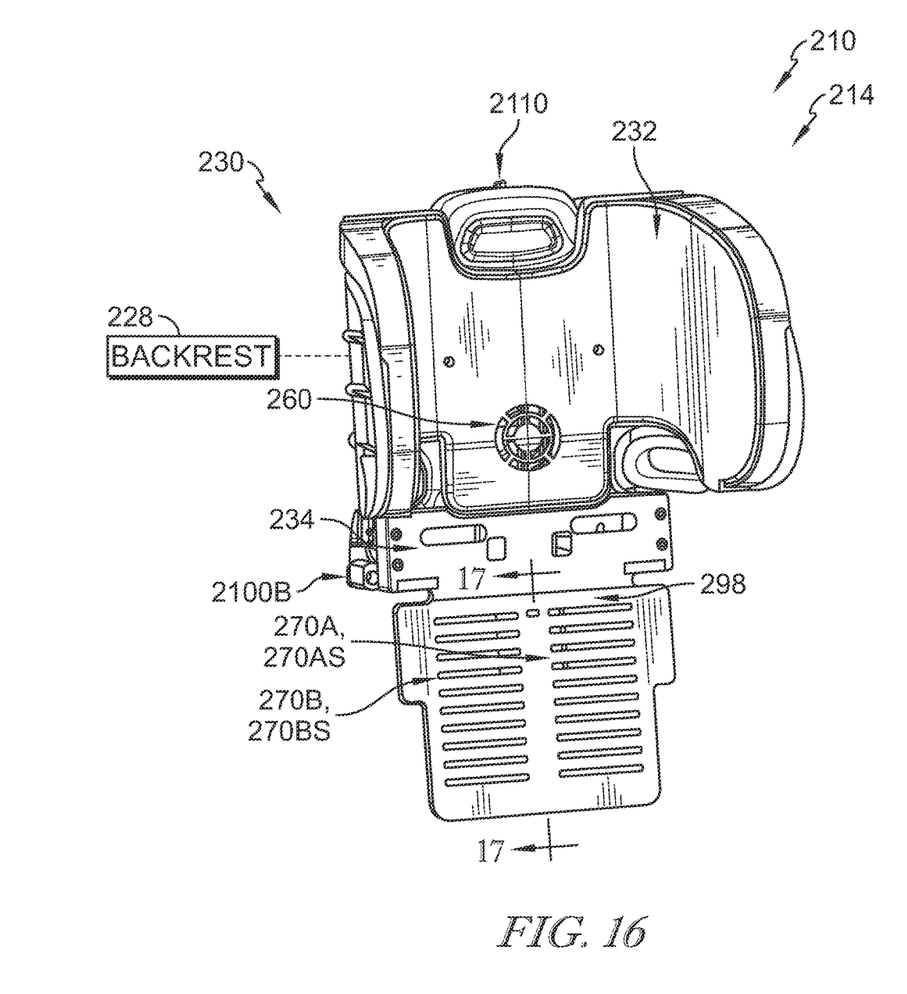
FIG. 16 is a front perspective view of another embodiment of the juvenile restraint according to the present disclosure showing that the headrest body is formed to include a series of apertures that includes several arched sections to form a circular pattern and cooperates with the upper fan unit to provide the upper air passageway.
Figure 17:
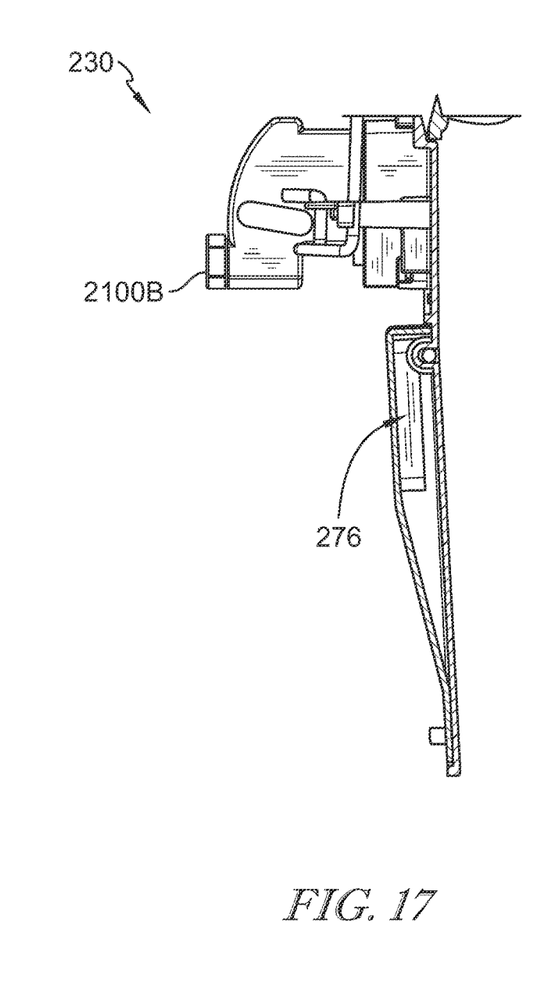
FIG. 17 is a cross section taken along line 17-17 in FIG. 16.

The seat back 224 includes a backrest 228 and a headrest 230 including a headrest body 232 and a ventilation manifold 234 as shown in FIG. 16. The headrest body 232 is coupled to the backrest 228 and provides support to a child's head. The ventilation manifold 234 is coupled to the headrest body 232 and encloses the fans 272, 274, 276, of the ventilation system 216.

Figure 18:
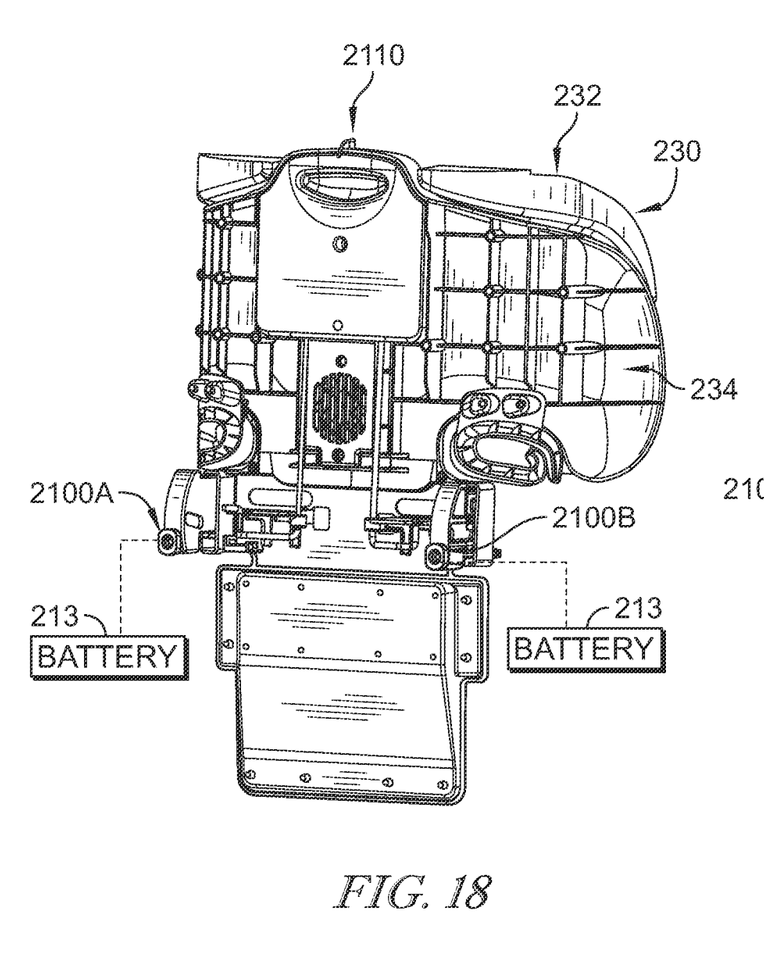
FIG. 18 is a rear perspective view of the juvenile restraint of FIG. 16 showing that the ventilation system includes two power receivers coupled to the ventilation manifold.
Figure 19:
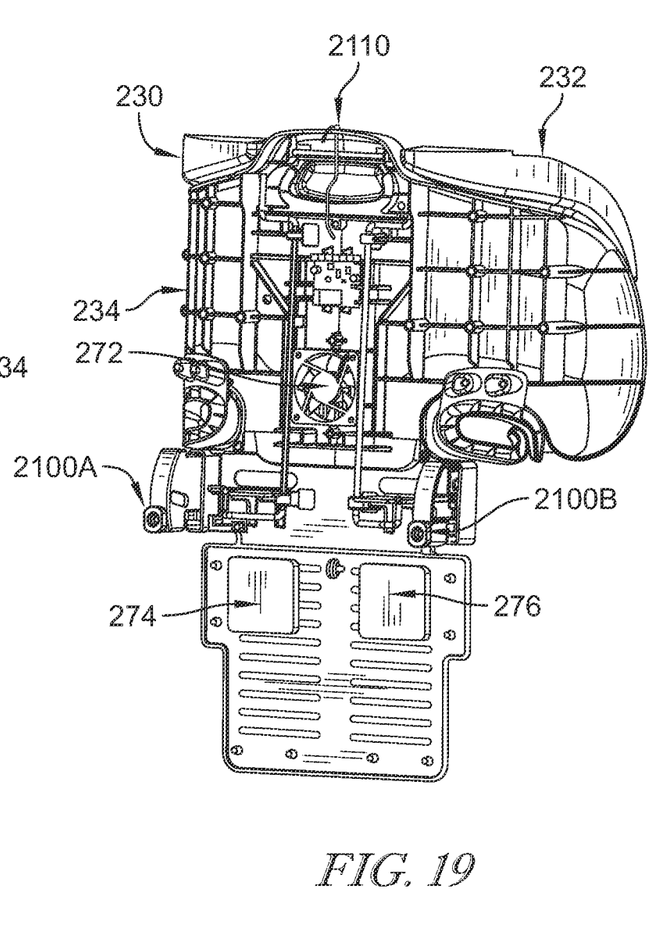
FIG. 19 is a rear perspective view of the juvenile restraint of FIG. 18 showing the lower backrest wall removed from the lower fan unit.

The headrest body 232 is formed to include a series of apertures 260 that cooperate to form the upper air passageway 242 so that a headrest airflow 246 may flow therethrough as shown in FIG. 16. The series of apertures 260 comprises several arched sections to form a circular pattern. The ventilation system 216 includes two power receivers 2100A, 2100B coupled to opposing outer lateral ends of the ventilation manifold 232 as shown in FIGS. 18 and 19. The two power receivers 2100A, 2100B are located on opposing outer lateral ends to facilitate easier connection to the battery 213 and/or a standalone battery when the juvenile restraint 210 is in a forward-facing arrangement, a rearward-facing arrangement, positioned on the passenger side of the vehicle, positioned on the driver side of the vehicle, or any combination of arrangements and positions of the juvenile restraint 210. Both power receivers 2100A, 2100B are adapted to power the ventilation system 216 with the vehicle battery 213 and/or a standalone battery.

The invention claimed is:

1. A juvenile restraint comprising
a juvenile seat including a seat bottom and a seat back coupled to the seat bottom to support a child restrained in the juvenile seat, the seat back including a backrest coupled to the seat bottom and arranged to extend upwardly away from the seat bottom and a headrest coupled to the backrest to move up and down relative to the backrest and positioned between the backrest and the child restrained in the juvenile seat, and
a ventilation system coupled to the headrest to move therewith, the ventilation system including a headrest fan coupled to the headrest and a torso fan coupled to the headrest, wherein the headrest fan and the torso fan are configured to control a headrest airflow and a torso airflow across the child restrained in the juvenile seat,
wherein the headrest includes a headrest body formed to include a head-receiving space and a ventilation manifold coupled to the headrest body and positioned between the headrest body and the backrest,
wherein the ventilation manifold includes an upper fan unit coupled to the headrest body and a lower fan unit located between the upper fan unit and the seat bottom,
wherein the upper fan unit is formed to include a headrest inlet, a headrest outlet spaced apart longitudinally from the headrest inlet toward the headrest body, and an upper longitudinally-extending wall interconnecting the headrest inlet and the headrest outlet such that the headrest inlet, the headrest outlet, and the upper longitudinally-extending wall cooperate to provide an upper air passageway for the headrest airflow, and
wherein the lower fan unit is formed to include a torso inlet, a torso outlet spaced apart longitudinally from the torso fan inlet toward the headrest body, and a lower longitudinally-extending wall interconnecting the torso inlet and the torso outlet such that the torso inlet, the torso outlet, and the lower longitudinally-extending wall cooperate to provide a lower air passageway for the torso airflow.

2. The juvenile restraint of claim 1, wherein the headrest body is formed to include a series of circular apertures that cooperate with the headrest inlet, the headrest outlet, and the upper longitudinally-extending wall to provide the upper air passageway.

3. The juvenile restraint of claim 2, wherein the series of circular apertures of the headrest body form a grid pattern to provide even distribution of the headrest airflow to the child restrained in the juvenile seat.

4. The juvenile restraint of claim 3, wherein the headrest fan rotates about a first rotational axis that extends longitudinally through the headrest body and the upper fan unit includes a headrest wall and an upper backrest wall spaced apart longitudinally from the headrest wall and is formed to include the headrest inlet, the headrest inlet being formed by a series of spaced-apart slots arranged vertically relative to the first rotational axis to streamline air external to the juvenile restraint that is drawn in through the headrest inlet by the headrest fan to provide the headrest airflow.

5. The juvenile restraint of claim 4, wherein the headrest wall is formed to include the headrest outlet, the headrest outlet being formed by a series of spaced-apart slots arranged vertically relative to the first rotational axis to streamline the headrest airflow out of the headrest outlet and through the series of circular apertures.

6. The juvenile restraint of claim 5, wherein the lower fan unit includes a torso wall and a lower backrest wall spaced apart longitudinally from the torso wall, the torso wall being formed to include the torso outlet formed by a series of spaced-apart slots arranged to extend laterally relative to the second rotational axis, each slot being spaced-apart vertically from each other down the height of the torso surface relative to the seat bottom to distribute the torso airflow across the height of the child's torso, the torso wall having a first height.

7. The juvenile restraint of claim 6, wherein the backrest wall includes an inlet surface and an airflow surface that extends downward from the inlet surface, the inlet surface being generally parallel to the torso wall and having a second height that is less than the first height, and the airflow surface extending longitudinally towards the torso wall to cooperate with the inlet surface and the torso wall to provide the lower air passageway, and
wherein the torso fan rotates about a second rotational axis that extends longitudinally through the lower fan unit relative to the seat bottom and is located between the seat bottom and the upper fan unit, and the inlet surface is formed to include the torso inlet formed by a series of spaced-apart slots that extend vertically relative to the second rotational axis to streamline air external to the juvenile restraint that is drawn in through the torso inlet by the torso fan to provide the torso airflow.

8. The juvenile restraint of claim 7,
wherein the torso fan is a first torso fan that rotates about the second rotational axis, and the ventilation system further includes a second torso fan that rotates about a third rotational axis that is generally parallel to the second rotational axis such that the third rotational axis and the second rotational axis are arranged to lie on a plane,
wherein the torso outlet is a first torso outlet and the torso inlet is a first torso inlet, the torso wall being formed to include a second torso outlet formed by a series of spaced-apart slots arranged to extend laterally relative to the third rotational axis, each slot in a respective series being spaced-apart vertically from each other down the height of the torso surface relative to the seat bottom to distribute at least a portion of the torso airflow across the height of the child's torso, the inlet surface being formed to include a second torso inlet formed by a series of spaced-apart slots that extend vertically relative to the third rotational axis to streamline air external to the juvenile restraint that is drawn in through the third torso inlet by the torso fan to provide at least a portion of the torso airflow, wherein the lower fan unit further includes an airflow divider coupled to at least one of the torso wall and the lower backrest wall, the airflow divider being located laterally between the first torso fan and the second torso fan and being configured to separate the lower air passageway into a first air passageway for a first stream of the torso airflow that may be controlled by the first torso fan and a second air passageway spaced laterally from the first air passageway for a second stream of the torso airflow that may be controlled by the second torso fan.

9. The juvenile restraint of claim 1, wherein the ventilation system further includes a temperature sensor coupled to the juvenile seat to detect a temperature of a space between the child restrained in the juvenile seat and the seat back and a controller having a processor and a memory storing instructions that, when executed by the processor, cause at least one of the headrest fan and the torso fan to change in speed based on a difference between the temperature of the space between the child restrained in the juvenile seat and the seat back and a predetermined temperature stored on the memory to adjust at least one of the headrest airflow and the torso airflow to circulate stagnant air behind the child restrained in the juvenile seat so that the temperature of the space between the child and the seat back changes toward the predetermined temperature.

10. The juvenile restraint of claim 9, wherein the upper fan unit includes a headrest-controller wall coupled to and extending upwardly from the headrest wall, a backrest-controller wall coupled to and extending upwardly from the upper backrest wall, and a longitudinally-extending controller wall interconnecting the headrest-controller wall and the backrest-controller wall, and the headrest-controller wall, the backrest-controller wall, and the longitudinally-extending controller wall cooperate to define a controller-receiving space for the controller.

* * * * *